(No Model.)
J. S. RANDALL.
RAT TRAP.
No. 559,604. Patented May 5, 1896.
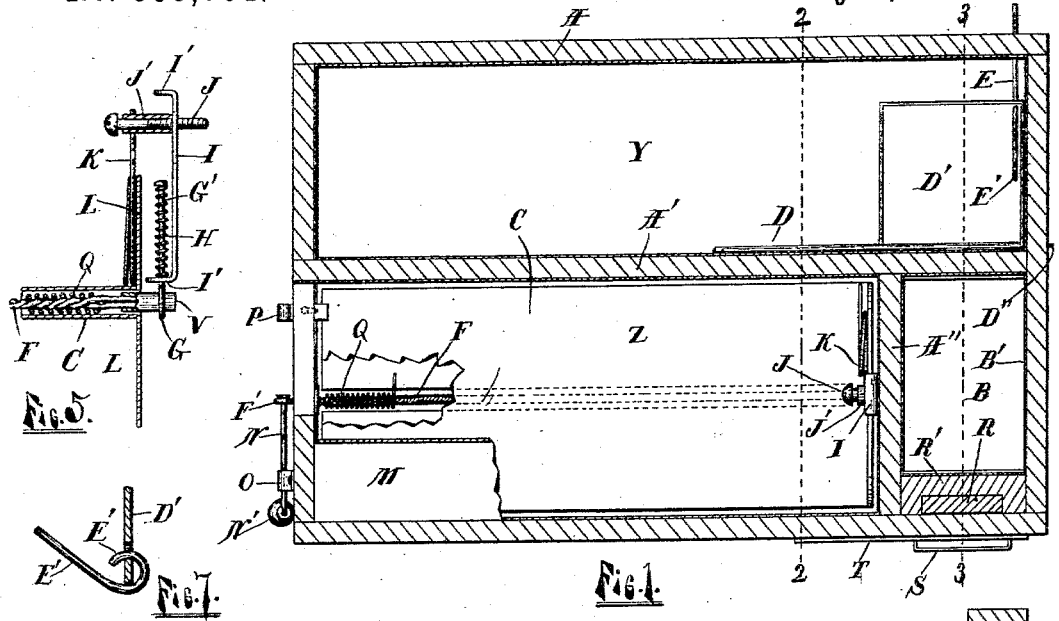
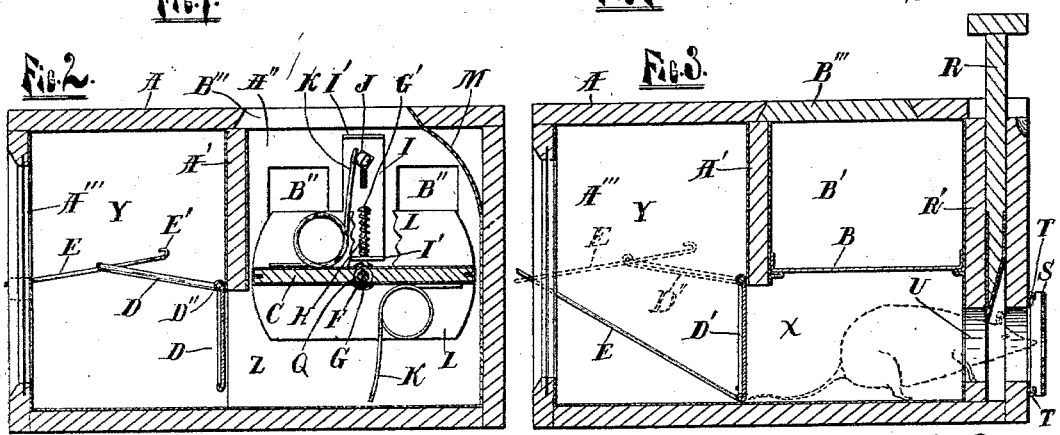
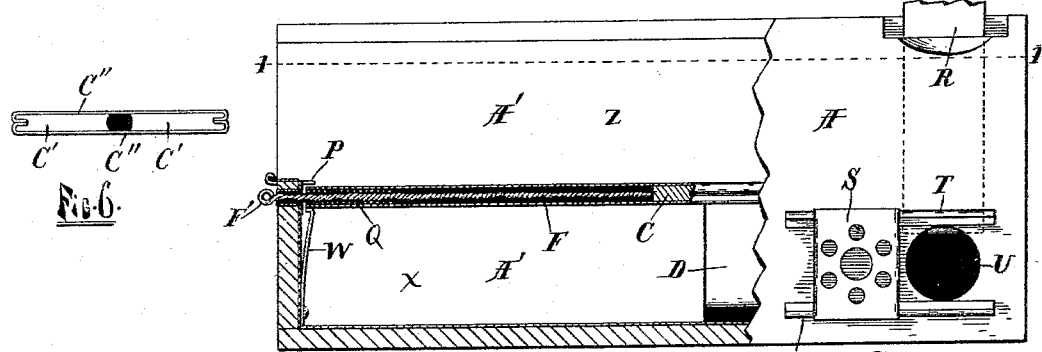
Witnesses
Lewis E. Flanders
Lois Moulton
Inventor
Joseph S. Randall
By Attorney
Luther V. Moulton

UNITED STATES PATENT OFFICE.

JOSEPH S. RANDALL, OF GRAND RAPIDS, MICHIGAN, ASSIGNOR OF ONE-HALF TO JOHN LEY, OF SAME PLACE.

RAT-TRAP.

SPECIFICATION forming part of Letters Patent No. 559,604, dated May 5, 1896.

Application filed January 23, 1896. Serial No. 576,610. (No model.)

*To all whom it may concern:*

Be it known that I, JOSEPH S. RANDALL, a citizen of the United States, residing at Grand Rapids, in the county of Kent and State of Michigan, have invented certain new and useful Improvements in Rat-Traps; and I do hereby declare the following to be a full, clear, and exact description of the invention, such as will enable others skilled in the art to which it appertains to make and use the same.

My invention relates to improved animal-traps, and more especially to those which are adapted to take and destroy small animals, such as rats or mice; and its object is to provide the same with certain new and useful features hereinafter more fully described, and particularly pointed out in the claims, reference being had to the accompanying drawings, in which—

Figure 1 is a sectional plan, on the line 1 1 of Fig. 4, of a device embodying my invention; Fig. 2, a vertical section of the same on the line 2 2 of Fig. 1; Fig. 3, the same on the line 3 3 of Fig. 1; Fig. 4, a side elevation with parts broken away; Fig. 5, a detail showing the controlling mechanism of the rotative platform; Fig. 6, an end elevation of the said platform, and Fig. 7 a detail showing the manner of engaging the operating-rod with the door D'.

Like letters refer to like parts in all of the figures.

A represents a rectangular case or box of any convenient dimensions divided longitudinally into two substantially equal compartments Y Z by a vertical partition A'. Near one end of the compartment Z is a transverse partition A'', forming a small compartment, divided horizontally by a plate B into a bait-box B' above said plate and an escape-passage X below the same.

B'' B'' are openings into said bait-box in the partition A'', and B''' is a sliding cover for said box B'. Said passage X connects with the compartment Y at one end and is closed by a door D', hinged at the upper edge to the partition A'. Said door is operated by means of a wire E, extending outside the case A at one end and having a hook E' on its inner end and passing through an opening near the lower edge of said door. Said hook is open, so that when the door is turned nearly in line with the rod said rod can be run inward, thus locking the door open, as shown in Figs. 1 and 3, and when the door is closed the same cannot be disengaged, as shown in Fig. 7, the portion of the door embraced by the hook being too wide to pass through the opening of the hook except when turned to present the edge of the door to said opening.

U is an opening through the case at the outer end of the passage X, which opening is closed by a slide S, having light-openings and movable on ways T T.

R is a slide movable in a guide R', the lower end of which slide is provided with any suitable means for killing the entrapped animal and traversing the opening U at said end. The compartment Z is preferably open at the top and at that part of the end opposite the bait-box, above the rotative platform C. Said platform is arranged horizontally in the compartment Z and mounted on a shaft F, arranged substantially in the axis of said compartment. Said shaft extends through the end wall of the case at one end and is formed of a single wire doubled at the middle and twisted, forming an eye F' at its outer end, in which eye is a crank N, rotative in said eye, whereby the handle N' may be turned down against the end of the case out of the way when not in use.

O is a hook fixed on the side of the case to engage the crank N and hold it from turning backward. A spring Q is coiled about said shaft and attached to the same by inserting one end of said spring between the parts of the wire forming the shaft, as shown in Fig. 5, the other end of said spring being attached to the platform C by inserting the same between the wood filling and sheet-metal plate of the same. By this construction I am able to provide a cheap and effective shaft, crank, and spring and means of attaching the same to each other. The end of the shaft F next the bait-box is provided with a short tube V, forming a bearing, which bearing is journaled in an eye G, formed in a vertically-movable rod G', extending upward through the lower flange I' of a vertically-adjustable plate I, having a similar flange I' at the upper end and secured when adjusted by a shouldered screw J, engaging a vertical slot in said plate and provided with a rotative sleeve J'.

H is a spring surrounding said rod G' and yieldingly supporting the same.

L L are end plates on the platform C, partially closing the openings B'' in the bait-box.

K K are alternately-acting spring-stops to engage the sleeve J' and hold the platform C in a horizontal position.

W is a spring-catch acting to hold the said platform from turning backward.

P is a locking-slide engaging said platform to prevent its action when necessary. Said platform is made of two strips of wood filling C', having concave adjacent edges and grooved outer edges, and plates of sheet metal C''', folded inward and engaging said grooves at their edges. I thus provide in said platform a suitable longitudinal opening for the spring Q and shaft F and secure the sheet-metal covering in a very economical manner.

D is a flap closing an opening in the partition A', having a light-opening beneath the same and attached at its upper edge to a rod D'', extending outside the case. Said door opens only in the direction of the compartment Y.

A''' is a grating or window through which light passes and by which the interior of the compartment Y may be observed.

M is a concave lining concentric with the axis of the platform.

The operation of my device is as follows: A rat or other small animal approaching the same and searching for access to the bait will find the openings B'', and in approaching these will step upon the platform C. This will cause the spring H to yield, and the platform will descend at that end. The stop K will thus be released from the roll J, which roll turning freely prevents any appreciable resistance to such descent of the platform. Should the animal prove too light to spring the trap, said animal in attempting to reach the bait through one of the openings B'', partially closed by the plate L, will press down on the edge of said plate and thus aid its weight in depressing the spring H. The spring Q now suddenly turns the platform upon its axis one-half of a revolution, thus precipitating the animal into the space below the platform C, the concave M preventing its escape past the edge of the platform. The light entering below the door D induces the animal to escape in that direction, and it passes into the compartment Y, from whence it can now be allowed to escape into the passage X by raising the door D' and locking the same open. It will now attempt to escape toward the light coming through the openings in the slide S, and can there be killed by depressing the slide R, or the slide S and door D' can both be opened and the animal be removed alive, if desirable so to do. Should the animal remain in the compartment below the platform, the door D can be opened to allow it to escape by turning the wire D'' where said wire projects outside the case.

Having thus described my invention, what I claim is—

1. In an animal-trap, a rotative platform, a spring to rotate the same, a fixed stop to hold said platform, stops on opposite sides of said platform engaging said fixed stop, a vertically-movable bearing for the journal of said platform, and a spring-support for said bearing, whereby the stops are disengaged by the descent of the platform, substantially as described.

2. In an animal-trap, a case having a compartment open at the top, a horizontal platform dividing said compartment and rotative upon its axis, a bait-box at the end of said compartment, a vertically-movable bearing for the journal of said platform, an adjustable spring-support for said bearing, an opening in said bait-box, a plate on said platform partially closing said opening, a fixed stop, and stops on the platform engaging said fixed stop and disengaged from the same by descent of the platform, substantially as described.

3. In an animal-trap, a case divided into two compartments by a vertical partition, having a flap-door near the bottom, a bait-box in the upper part of one compartment and at the end thereof, a platform horizontally dividing said compartment and rotative on a horizontal axis, a vertically-adjustable plate on said bait-box, a flange on said plate, a rod vertically movable in said flange having an eye in its end, a spring supporting said rod, a journal for said platform rotative in said eye, a fixed stop on the bait-box, and stops on the platform engaging said fixed stop and disengaged therefrom by descent of said platform, openings in said bait-box, and a plate on said platform partially closing said openings, substantially as described.

4. In an animal-trap, in combination with a suitable case, having a platform rotative upon a horizontal axis, and a spring to rotate said platform, a vertically-slotted plate having a flange at its lower end, a shouldered screw engaging the slot in said plate, a roll on said screw, a rod vertically movable in an opening in the lower flange, and having an eye at its lower end, a spring yieldingly supporting said rod, a journal on the platform rotative in said eye, and stops on said platform engaging said roll and disengaged therefrom by descent of said platform, substantially as described.

5. In an animal-trap, in combination with a case, and a platform rotative on an axis, a shaft consisting of a wire doubled and twisted and having an eye, a crank rotative within said eye, a spring coiled around said shaft, having one end inserted between the parts of the wire forming the same, and the other end attached to the platform, a stop engaging the crank, and stops to hold the platform from turning until depressed by the weight of the animal, substantially as described.

6. In an animal-trap, in combination with a case, and a platform rotative upon its axis, a shaft in the axis of said platform, a fixed bearing for one end of said shaft, a vertically-movable bearing for the other end of said shaft, a spring-support for said movable bearing, a fixed stop above said movable bearing, stops on said platform engaging said fixed stop, a spring coiled around said shaft, and attached to the same at one end, and to said platform at the other end, a crank on said shaft and a stop engaging said crank, substantially as described.

7. In an animal-trap, in combination with a case having an upper and lower compartment divided by a rotative platform, and a bait-box at one end of said compartment having openings in the side adjacent said platform, a shaft in the axis of said platform, consisting of a wire doubled and twisted and having a fixed bearing for its outer end, a crank rotative in the eye of said shaft, a stop engaging said crank, a spring coiled about said shaft, and having one end inserted between the wires of the same, and the other end attached to the platform, a vertically-adjustable slide having a flange, a rod vertically movable in said flange having an eye forming the journal-bearing of the inner end of said shaft, a spring coiled about said rod and supporting the same, a shouldered screw having a roll and engaging a slot in the adjustable plate, spring-stops on opposite sides of said platform, and a stop to prevent the backward movement of said platform upon its axis, substantially as described.

8. In an animal-trap, a platform, consisting of filling-pieces, having concave adjacent edges and grooved outer edges, and sheet-metal plates, having inwardly-turned edges engaging said grooves, in combination with a shaft, spring and stops, substantially as described.

9. In an animal-trap, a platform, consisting of filling-pieces having concave inner edges, and grooved outer edges, and plates having inwardly-turned edges engaging said grooves, a shaft consisting of a wire doubled and twisted, and having an eye in its outer end and a sleeve on its inner end, a spring coiled around said shaft, having one end inserted between the wires of the same, and the other end inserted between the plates and filling of the platform, and a crank rotative in said eye, substantially as described.

10. In an animal-trap, in combination with a door hinged at its upper edge, to permit the passage of the entrapped animal, a rod for operating said door, having an open hook engaging an opening near the lower edge of said door, the portion of the door embraced by said hook being wider than the opening in said hook, whereby said rod is adapted to run inward through said opening when the door is open, and to be prevented from so doing when the door is closed, substantially as described.

11. In an animal-trap, in combination with means for capturing the animal, an escape-passage, a slide closing the outer end of the same having light-openings, and a slide traversing said escape-opening having attached means for killing the animal, substantially as described.

12. In an animal-trap, a case divided longitudinally by a vertical partition, into two compartments, a transverse partition and floor forming a bait-box and escape-passage in one of said compartments, capturing mechanism in said compartment, a flap-door leading to the other of said compartments, and a door leading to the escape-passage, and rods extending outside the case and connected to said doors to manipulate the same, an escape-opening at the outer end of said passage, a slide having light-openings, and closing or opening said escape-opening, and a killing-slide traversing said escape-opening, substantially as described.

In testimony whereof I affix my signature in presence of two witnesses.

JOSEPH S. RANDALL.

Witnesses:
LUTHER V. MOULTON,
LEWIS E. FLANDERS.